United States Patent [19]

Brunelle et al.

[11] Patent Number: 4,696,998

[45] Date of Patent: Sep. 29, 1987

[54] CYCLIC HETEROCARBONATES AND METHODS FOR THEIR PREPARATION AND USE

[75] Inventors: Daniel J. Brunelle; Thomas L. Guggenheim; Eugene P. Boden, all of Scotia; Thomas G. Shannon, Schenectady; Joseph W. Guiles, Cohoes, all of N.Y.

[73] Assignee: General Electric Company, Schenectady, N.Y.

[21] Appl. No.: 890,053

[22] Filed: Jul. 28, 1986

[51] Int. Cl.[4] .............................................. C08G 63/62
[52] U.S. Cl. ................................... 528/272; 528/308; 528/322; 528/369; 528/370; 528/271; 528/296; 528/308.6
[58] Field of Search ............... 528/272, 308, 322, 369, 528/370, 296, 308.6, 271; 549/214, 216, 228

[56] References Cited

U.S. PATENT DOCUMENTS 3,297,634  1/1967  Oxenrider et al. .................. 549/228

FOREIGN PATENT DOCUMENTS 0162379  5/1985  European Pat. Off. .

*Primary Examiner*—Maurice J. Welsh
*Attorney, Agent, or Firm*—William H. Pittman; James C. Davis, Jr.; James Magee, Jr.

[57] ABSTRACT

Cyclic heterocarbonates containing linkages such as ester, urethane, imide, ether sulfone, ether ketone or amide may be prepared from the corresponding bishaloformates. They may be converted to linear copolycarbonates.

29 Claims, No Drawings

CYCLIC HETEROCARBONATES AND METHODS FOR THEIR PREPARATION AND USE

This invention relates to new cyclic carbonate compositions which may be polymerized to polycarbonate copolymers, and methods for their preparation and polymerization.

Various polycarbonate copolymers are known. These include polyester-polycarbonates, polysiloxane-polycarbonates, polyphenylene ether-polycarbonates, polyethersulfonepolycarbonates and polyamide-polycarbonates. These copolymers are typically prepared by methods whose conditions depend on those used for the preparation of homopolycarbonates. For example, polyester-polycarbonates may be prepared by incorporating a dicarboxylic acid chloride in the interfacial reaction mixture used to prepare polycarbonates from bisphenols and phosgene. Block polyphenylene ether-polycarbonates and polysiloxane-polycarbonates may be similarly prepared by the incorporation of polyphenylene ethers or halogen-terminated polysiloxanes.

The copolymers prepared by these methods are frequently cumbersome to use for the preparation of molded parts and the like because of their high viscosities. On the other hand, it has not been possible to integrate preparation methods involving the use of phosgene with forming operations because of the presence of volatile solvents such as methylene chloride, during or after polymerization.

A principal object of the present invention, therefore, is to prepare novel cyclic copolycarbonates.

A further object is to provide a method for preparation of high molecular weight copolycarbonates by a method which is readily integrated with polymer forming operations such as molding.

Other objects will in part be obvious and will in part appear hereinafter.

In one of its aspects, the present invention includes compositions comprising cyclic heterocarbonate oligomers having the formula

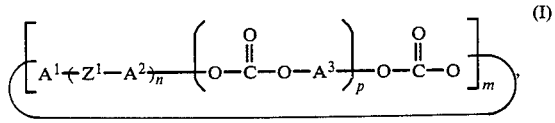

wherein:
each of $A^1$, $A^2$ and $A^3$ is independently a divalent aromatic hydrocarbon or substituted aromatic hydrocarbon radical;
$Z^1$ is a divalent radical containing at least two non-carbon linking atoms;
m is from 1 to about 12;
n is from 1 to about 6; and
p is from 0 to about 6;
the total number of carbonate moieties in each of said oligomers being up to about 12.

The $A^1$, $A^2$ and $A^3$ values in the compositions of this invention are divalent aromatic radicals. They include hydrocarbon radicals and substituted hydrocarbon radicals wherein the substituents may be alkyl (particularly $C_{1-4}$ alkyl), halo, nitro, cyano, alkoxy and the like. Most often, the $A^{1-3}$ radicals are all hydrocarbon radicals and $A^1$ is identical to $A^2$.

The $A^{1-3}$ radicals are most often each m- or p-phenylene or have the formula $$-A^4-Y^1-A^5-, \quad (II)$$

wherein each of $A^4$ and $A^5$ is a monocyclic divalent aromatic radical and $Y^1$ is a bridging radical in which one or two atoms separate $A^4$ from $A^5$. The free valence bonds in formula II are usually in the meta or para positions of $A^4$ and $A^5$ in relation to $Y^1$.

In formula II, the $A^4$ and $A^5$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^4$ and $A^5$ are preferably p-phenylene, although both may be o- or m-phenylene or one o- or m-phenylene and the other p-phenylene.

The bridging radical, $Y^1$, is one in which one or two atoms, preferably one, separate $A^4$ from $A^5$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, oxy, sulfide, sulfoxy and sulfone.

The $A^{1-3}$ radicals may be considered as being derived from dihydroxyaromatic compounds, including bisphenols of the formula HO—$A^4$—$Y^1$—$A^5$—OH. The following dihydroxyaromatic compounds are illustrative:
Resorcinol
6-Bromoresorcinol
Hydroquinone
4,4'-Dihydroxybiphenyl
1,6-Dihydroxynaphthalene
2,6-Dihydroxynaphthalene
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-(3-hydroxyphenyl)propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
α,α'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3-5-dichloro-4-hydroxyphenyl)propane
2,2-Bis(3,5-dibromo-4-hydroxyphenyl)propane 2,2-Bis(2,6-dibromo-3,5-dimethyl-4-hydroxyphenyl)propane
α,α,α-Bis(4-hydroxyphenyl)toluene
α,α, α', α'-Tetramethyl-α,α'-bis(4-hydroxy-phenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxy-phenyl)ethylene
4,4'-Dihydroxybenzophenone
3,3-Bis(4-hydroxyphenyl)-2-butanone
1,6-Bis(4-hydroxyphenyl)-1,6-hexanedione
Ethylene glycol bis(4-hydroxyphenyl) ether
Bis(4-hydroxyphenyl) ether
Bis(4-hydroxyphenyl) sulfide
Bis(4-hydroxyphenyl) sulfoxide
Bis(4-hydroxyphenyl) sulfone
Bis(3,5-dimethyl-4-hydroxyphenyl) sulfone
9,9-Bis(4-hydroxyphenyl)fluorene
2,7-Dihydroxypyrene
6,6'-Dihydroxy-3,3,3',3'-tetramethylspiro(bis)indane ("spirobiindane bisphenol")
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

Bisphenol A (in which $A^4$ and $A^5$ are each p-phenylene and $Y^1$ is isopropylidene) is often preferred, especially as the source of $A^3$, for reasons of availability and particular suitability for the purposes of the invention.

The $Z^1$ value is a divalent radical containing at least two non-carbon linking atoms. By "non-carbon linking atom" is meant an atom other than carbon or hydrogen forming an integral link between two portions of the molecule of formula I, rather than merely forming all or part of a substituent thereon. The $Z^1$ value may also contain one or more aliphatic, alicyclic or aromatic hydrocarbon or substituted hydrocarbon moieties.

Suitable linking atoms include oxygen, sulfur, nitrogen, phosphorus and silicon. Thus, the $Z^1$ value is characterized by the presence of two or more moieties such as amide, imide, urethane, urea, sulfonamide, imidazole, oxazole, thiazole, ether, ester, sulfide, sulfoxy, sulfone, phosphate, phosphite, phosphoramidate, phosphazene, phosphonate and siloxane.

The following are illustrative $Z^1$ *values. In each formula, $R^1$ and $R^2$ may each be a mono- or polyvalent aliphatic, alicyclic or aromatic radical as appropriate.*

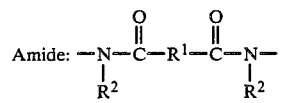

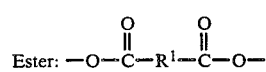

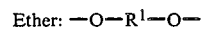

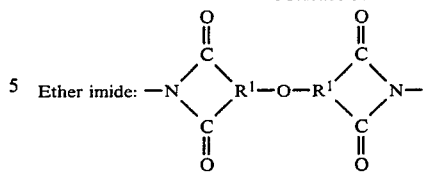

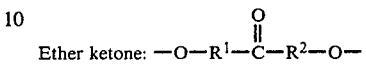

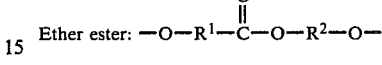

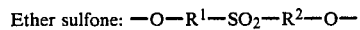

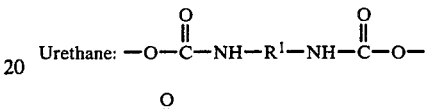

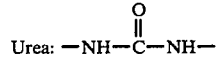

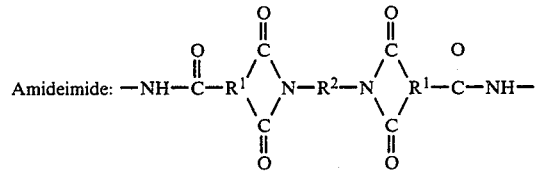

Sulfide: —S—$R^1$—S—

Sulfone: —$SO_2$—$R^1$—$SO_2$—

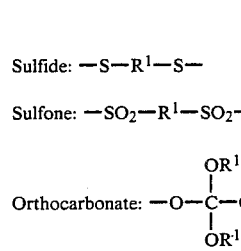

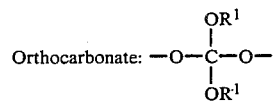

Sulfonamide: —NH—$SO_2$— or —NH—$SO_2$—$R^1$—$SO_2$—NH—

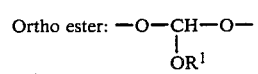

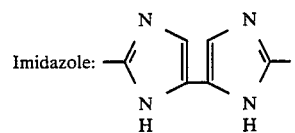

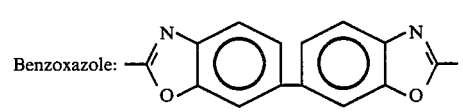

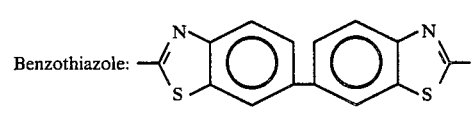

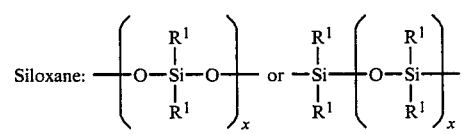

(x = 1 or more)

Phosphate: 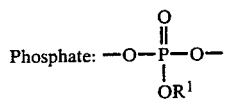

Phosphite: 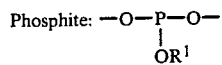

Phosphoramidate: 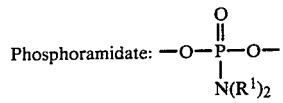

Phosphonate: 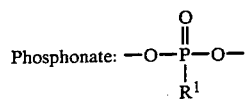

Phosphazene: 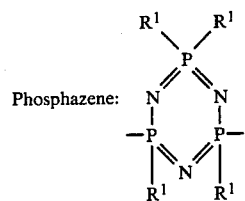

It should be understood that the foregoing molecular structures are only illustrative and that numerous other types of structures are suitable as the $Z^1$ value in the compositions of this invention.

It is generally preferred that $Z^1$ have a total formula weight of at least 50, more preferably at least 80. Still more desirably, the $$-A^1-(Z^1-A^2)_{\overline{n}} \qquad (III)$$

moiety has a formula weight of at least about 200, and most desirably at least about 500. (However, formula weights above about 1500 are generally not preferred since molecules containing such large groups may be difficult to convert into cyclics, favoring formation of linears.) Included are oligomer mixtures in which n may have any and all values up to about 6. Most often, a major proportion of the radicals of formula III are monomer, dimer and trimer radicals (n is 1, 2 and 3 respectively).

Among the particularly preferred cyclic heterocarbonates of this invention are those in which $Z^1$ contains at least one ester, amide, urethane, ether ester, ether imide or ether sulfone moiety. The following are still more particularly preferred; in each instance, $A^1$ and $A^2$ are as previously defined.

(1) Polyester-carbonates in which $Z^1$ has the formula

wherein $R^3$ is a divalent $C_{2-12}$ aliphatic, alicyclic or aromatic hydrocarbon radical, and n has an average value of 1–3. Most often, $R^3$ is a monocyclic aromatic hydrocarbon radical, preferably m- or p-phenylene.

(2) Polyurethane-carbonates in which $Z^1$ has one of the formulas

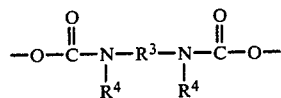

and

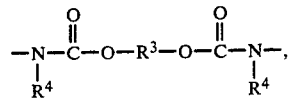

wherein $R^3$ is as previously defined and $R^4$ is hydrogen or a $C_{1-12}$ alkyl, cycloalkyl or aromatic hydrocarbon radical or both $R^4$ radicals taken together form a $C_{2-12}$ alkylene radical, and n is from 1 to 3 and preferably 1. When both $R^4$'s are alkylene (generally applicable to formula V), they and $R^3$ are usually each an ethylene or hydrocarbon-substituted ethylene radical.

(3) Polyimide-polycarbonates in which $Z^1$ has the formula

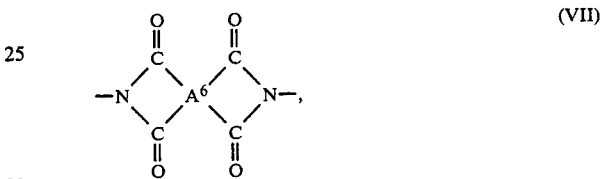

wherein $A^6$ is a tetravalent aromatic radical, and n is 1. Suitable $A^6$ values include monocyclic radicals such as that derived from pyromellitic acid; bicyclic radicals such as those derived from the biphenyl-, benzophenone-, diphenyl sulfide and diphenyl sulfone tetracarboxylic acids; and radicals derived from the 2,2-bis[4-(dicarboxyphenoxy)phenyl]propanetetracarboxylic acids, especially the 3,4-dicarboxyphenoxy acid whose dianhydride is frequently and hereinafter designated "bisphenol A dianhydride".

(4) Polyether-polycarbonates in which $Z^1$ has the formula $$-O-A^7-Z^2-A^7-O- \qquad (VIII)$$

wherein $A^7$ is a $C_{6-12}$ divalent aromatic radical and $Z^2$ is CO or $SO_2$ and n has an average value of 1-3. Most often, $A^2$ and $A^7$ are both m- or p-phenylene.

(5) Polyamide-polycarbonates in which $Z^1$ has the formula

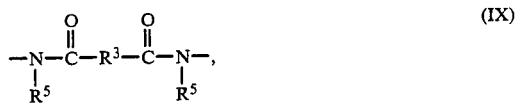

wherein $R^3$ is as previously defined and $R^5$ is hydrogen or a primary or secondary $C_{1-4}$ alkyl radical and is preferably hydrogen or methyl, and n is 1.

The value of the subscript m is from 1 to about 12, whereby the compositions include cyclic carbonate monomers and oligomers. The value of p is discussed more fully hereinafter. In any event, a total of up to about 12 carbonate (i.e., $CO_3$) moieties is present in each molecular species which is an essential constituent of the compositions of the invention.

The cyclic heterocarbonates of this invention may be prepared by reacting (A) a composition comprising (A-1) at least one compound of the formula $$Y^2-O-A^1-(Z^1-A^2)_n-O-Y^2 \quad (X)$$

or a mixture thereof with (A-2) at least one compound of the formula $$Y^3-O-A^3-O-Y^3, \quad (XI)$$

wherein $A^1$, $A^2$, $A^3$, $Z^1$ and n are as defined hereinabove, the $Y^2$ and $Y^3$ values in each compound are both $$\begin{array}{c} H \text{ or } O \\ \parallel \\ C-X \end{array}$$

and X is chlorine or bromine, with the proviso that at least one of $$Y^2 \text{ and } Y^3 \text{ is } \begin{array}{c} O \\ \parallel \\ C-X \end{array};$$

with (B) at least one oleophilic, aliphatic or heterocyclic tertiary amine, and (C) an aqueous alkali or alkaline earth metal hydroxide or carbonate solution;

in (D) a substantially non-polar organic liquid which forms a two-phase system with water. The details of preparation are similar to those for preparing cyclic polycarbonate oligomers as described in European patent application No.162,379 and in copending, commonly owned application Ser. No. 871,641, filed June 6, 1986, the disclosures of which are incorporated by reference herein. This method of preparation is another aspect of the invention.

It will be apparent from the foregoing that at least one compound within the class identified as reagent A must be a bishaloformate. While the X values may be chlorine or bromine, the bischloroformates, in which X is chlorine, are most readily available and their use is therefore preferred. Frequent reference to bischloroformates will be made hereinafter, but it should be understood that other bishaloformates may be substituted therefor as appropriate.

Bischloroformates useful as reagent A may be prepared by known methods, typically involving the corresponding dihydroxy compound as a reactant. Certain of these dihydroxy compounds are disclosed and claimed in copending, commonly owned applications. In particular, certain urethane bisphenols and bisamide bisphenols and corresponding bischloroformates are dealt with in Ser. No. 890,054, filed Jul. 28, 1986 and certain bisimide bisphenols in Ser. No. 891,014, filed Jul. 31, 1986.

To prepare the bischloroformate, the dihydroxy compound may be reacted with phosgene in the presence of an amine and/or aqueous alkali metal hydroxide. Such reactions are disclosed, for example, in U.S. Pat. Nos. 3,189,640, 3,255,230, 3,312,661, 3,966,785 and 3,974,126; in British Pat. No. 613,280; and in copending, commonly owned application Ser. No. 790,909, filed October 24, 1985, now U.S. Pat. No. 4,638,077, of which is incorporated by reference herein.

Reagent A may be a mixture of reagents A-1 and A-2, whereupon the cyclic heterocarbonate product will be one in which p has a positive value up to about 6; or it may consist essentially of reagent A-1, whereupon p will be zero. Moreover, it may be a mixture of dihydroxy compounds and bischloroformates (reagent A-1 preferably being at least one bischloroformate), usually containing up to about 5 moles of bischloroformate per mole of dihydroxy compound, or it may contain only bischloroformates. The latter situation, especially in which reagent A consists essentially of reagent A-1, is usually preferred. Reagent A-1 may be a monomer (n=1) or an oligomer (n is greater than 1).

The tertiary amines useful as reagent B ("tertiary" in this context denoting the absence of N-H bonds) generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in U.S. Pat. Nos. 4,217,438 and 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and reagent A is essential for the formation of the cyclic heterocarbonate. For the most part, such amines contain at least about 6 and preferably about 6-14 carbon atoms.

The amines most useful as reagent B are trialkylamines containing no branching on the carbon atoms in the 1-and 2-positions. Especially preferred are tri-n-alkylamines in which the alkyl groups contain up to about 4 carbon atoms. Triethylamine is most preferred by reason of its particular availability, low cost, and effectiveness.

Reagent C is an aqueous alkali or alkaline earth metal hydroxide or carbonate solution, such as lithium, sodium, potassium or calcium hydroxide or sodium or potassium carbonate. It is most often lithium, sodium or potassium hydroxide, with sodium hydroxide being preferred because of its availability and relatively low cost. The concentration of said solution is not critical; it is generally about 0.1-16 M, preferably about 0.2-10 M and most desirably no higher than about 5 M.

The fourth essential component (component D) in the cyclic heterocarbonate preparation method of this invention is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran. Methylene chloride is generally preferred.

To prepare the cyclic heterocarbonate, the reagents and components are maintained in contact under conditions whereby reagent A is present in low concentration. Actual high dilution conditions, requiring a large proportion of component D, may be employed but are usually not preferred for cost and convenience reasons. Instead, simulated high dilution conditions known to those skilled in the art may be employed. For example, in one embodiment of the method reagent A or reagents A and B are added gradually to a mixture of the other materials. It is within the scope of this embodiment to incorporate reagent B in the mixture to which reagent A is added, or to add it gradually, either in admixture with reagent A or separately. Continuous or incremental addition of reagent B is frequently preferred.

Although addition of reagent A neat (i.e., without solvents) is within the scope of this embodiment, it is often preferably added as a solution in a portion of component D. The proportion of organic liquid used for this purpose is not critical; about 25–75% by weight, and especially about 40–60%, is often preferred.

The reaction temperature is generally in the range of about 0°–50° C. It is most often about 0°–40° C. and preferably 20°–40° C.

For maximization of the yield and purity of cyclic heterocarbonates, it is preferred to use up to about 0.7 mole and preferably about 0.1–0.6 mole of reagent A per liter of component D in the reaction system, including any liquid used to dissolve reagent A. (It should be noted that this is not a molar concentration in component D when reagent A is added gradually, since said reagent is consumed as it is added to the reaction system.) The preferred molar ratio of reagent B to reagent A is about 0.05–1.5:1 and most often about 0.1–1.0:1. The molar ratio of reagent C to reagent A is usually about 1–5:1 and preferably about 1–3:1.

A highly preferred embodiment of the method for preparing the cyclic heterocarbonates comprises gradually adding reagent A and at least a portion of reagents B and C simultaneously to a substantially non-polar organic liquid (component D) or to a mixture of said liquid with water. A factor of some importance in this embodiment is the concentration of available reagent B, which should be maintained at a level as constant as possible during the entire addition period for reagent A. If all of reagent B is present in the reaction vessel into which reagent A is introduced, its concentration steadily decreases, principally by dilution. On the other hand, if reagent B is introduced continuously or in equal increments during introduction of reagent A, its available concentration is initially low and increases more or less steadily during the addition period. These fluctuations can result in a high and constantly varying proportion of high polymer (i.e., linear or cyclic polymer with a weight average molecular weight higher than about 30,000) in the product.

It has been found advantageous to introduce reagent B in one initial large portion, usually about 40–95% and preferably about 40–75% by weight of the total amount, followed by incremental or continuous addition of the balance thereof. By this procedure, the concentration of available reagent B is maintained at a fairly constant level in the organic phase during the entire addition period, and it is possible to minimize the proportion of high polymer in the product.

Under these conditions, it is usually advantageous for the reaction vessel to initially contain about 5–40% and preferably about 5–30% of total reagent C. The balance thereof is also introduced continuously or incrementally.

In general, cyclic heterocarbonates prepared under these conditions contain very low proportions of linear oligomers. In many instances no more than about 5% by weight, and frequently no detectable amount, of such linear oligomers are present. Many products of this invention also contain low percentages (frequently less than 20% and preferably no higher than about 10%) of polymers (linear or cyclic) having a degree of polymerization greater than about 30. Such polymers are frequently identified hereinafter as "high polymer".

When necessary, linears, high polymer and other impurities may be removed by conventional operations such as combining the solution with a non-solvent for said impurities. Illustrative non-solvents include ketones such as acetone and methyl isobutyl ketone and esters such as methyl acetate and ethyl acetate. Acetone is a particularly preferred non-solvent.

The preparation of cyclic heterocarbonates of this invention is illustrated by the following examples.

EXAMPLE 1

A solution in a 20:1 (by volume) mixture of methylene chloride and tetrahydrofuran of 57.07 grams (250 mmol.) of bisphenol A and 10.1 grams (100 mmol.) of triethylamine was cooled to 0° C. and a solution of 10.2 grams (50 mmol.) of isophthaloyl chloride was added over 15 minutes, with stirring. The reaction mixture was allowed to warm to room temperature and quenched with 3 M aqueous hydrochloric acid. The organic phase was separated, washed with dilute hydrochloric acid and water and vacuum stripped. The residue was extracted with methylene chloride to separate the product from unreacted bisphenol A and the resulting solution was again vacuum stripped. Additional unreacted bisphenol A was removed by extraction of the product with heptane in a Soxhlet extractor. The product was shown by infrared and nuclear magnetic resonance spectroscopy and high pressure liquid-liquid chromatography to comprise 75% (by weight) bis(bisphenol A) isophthalate monomer, 21% dimer, 3% trimer and 1% tetramer.

A solution of 8.5 grams (14.5 mmol.) of crude bis(bisphenol A) isophthalates in 100 ml. of methylene chloride was cooled to 0° C. under nitrogen, with stirring, and phosgene was passed in at 1 gram per minute for 4 minutes (total 40 mmol.). There was then slowly added at 0° C., with continued stirring, 4.5 grams (30 mmol.) of diethylaniline. The mixture was allowed to warm to room temperature over 2 hours and was sparged with nitrogen to remove excess phosgene. It was washed with dilute aqueous hydrochloric acid and water, extracted with methylene chloride, dried and vacuum stripped to yield the desired crude bischloroformate as an oil.

A mixture of 5 ml. of methylene chloride, 2 ml. of 5 M aqueous sodium hydroxide solution and 0.2 ml. of triethylamine was heated to reflux, with stirring, and a methylene chloride solution of the entire portion of crude bischloroformates was added over 30 minutes. At the same time, 3 ml. of 5 M aqueous sodium hydroxide and 0.02 ml. of triethylamine were added incrementally in 5 portions. When addition was complete, the organic and aqueous phases were separated and the aqueous phase was washed with a small portion of methylene chloride. The combined organic phases were washed three times with dilute aqueous hydrochloric acid and once with water, dried and evaporated to yield the desired cyclic polyester-carbonate oligomer composition as a white powder. High pressure liquid-liquid chromatographic analysis showed the absence of cyclic homopolycarbonates and linear oligomers, and the presence of about 4% high polymer.

EXAMPLE 2

The procedure of Example 1 was repeated, substituting adipoyl chloride on an equimolar basis for the isophthaloyl chloride. A similar product was obtained.

EXAMPLE 3

A mixture of 50 mmol. of 2-(4-hydroxyphenyl)-2-(4-methylaminophenyl)propane, 50 mmol. of sodium bicarbonate, 500 ml. of water and 50 ml. of methylene chloride was mixed at high speed in a blender as a solution of 25 mmol. of isophthaloyl chloride in 25 ml. of methylene chloride was added over 5 minutes. Blending was continued for 10 minutes, yielding a heterogeneous mixture which was extracted with ethyl acetate. Upon vacuum stripping, the desired bisamide bisphenol was obtained.

A mixture of 6.12 grams (10 mmol.) of the bisamide bisphenol and 50 ml. of methylene chloride was cooled to 0° C. and phosgene was passed in at 1 gram per minute for 3 minutes. A solution of 3 grams (20 mmol.) of diethylaniline in methylene chloride was then added slowly, with stirring, as the temperature was maintained at 0° C. The mixture was allowed to warm to room temperature over 15 minutes and stirred for one additional hour. Toluene, 50 ml., was then added with stirring and the mixture was sparged with nitrogen to remove excess phosgene and methylene chloride. The toluene solution was washed with dilute aqueous hydrochloric acid and water, yielding the crude bischloroformate.

A solution of the crude bischloroformate in 10 ml. of methylene chloride was added over 35 minutes, with stirring, to a refluxing mixture of 25 ml. of methylene chloride, 1 ml. of 5 M aqueous sodium hydroxide solution and 0.1 ml. of triethylamine. There were simultaneously added in equal portions, at 7-minute intervals, 4 ml. of 5 M aqueous sodium hydroxide solution and 0.11 ml. of triethylamine. Upon workup substantially as described in Example 1, the cyclic bisamide carbonate oligomer mixture, melting in the range of 140°–160° C., was obtained. It was shown by high pressure liquid-liquid chromatographic analysis to comprise 2.9% monomer, 43.2% dimer, 21.35% trimer, 9.42% tetramer and minor amounts of higher oligomers.

EXAMPLE 4

A mixture of 100.37 grams (192.8 mmol.) of bisphenol A dianhydride, 42.08 grams (385.6 mmol.) of m-aminophenol and 500 ml. of glacial acetic acid was heated under reflux for 4 hours, after which the acetic acid was removed by vacuum stripping, yielding a white solid which was collected by filtration and washed with cold methanol. The product was shown by elemental analysis to be the desired bisphenol A bis-N-(3-hydroxyphenyl)imide.

A solution in 200 ml. of methylene chloride of 12.56 grams (17.9 mmol.) of the above-described bisimide was cooled to 0° C. and 5.3 grams (53.7 mmol.) of phosgene was metered in under the surface. A solution of 8 grams (53.68 mmol.) of diethylaniline in 20 ml. of methylene chloride was added over 15 minutes, with stirring and continued cooling. An exothermic reaction took place and the temperature rose to 8° C. Stirring was continued for 1 hour at 8° C. and for 1 hour at room temperature, after which the solution was sparged with nitrogen for 1 hour to remove excess phosgene. It was then diluted with 100 ml. of methylene chloride, washed three times with dilute aqueous hydrochloric acid and once with aqueous sodium chloride solution, dried over anhydrous magnesium sulfate, filtered and vacuum stripped to yield the bisimide bischloroformate as a glassy solid.

A mixture of 15 ml. of methylene chloride, 0.1 gram of triethylamine, 0.3 ml. of 5 M aqueous sodium hydroxide solution and 1 ml. of water was heated at 40° C., with stirring. There were separately added over ½ hour a solution of 5 grams of the bisimide bischloroformate in 5 ml. of methylene chloride, 2.7 ml. of 5 M aqueous sodium hydroxide solution and a solution of 52 mg. of triethylamine in 2 ml. of methylene chloride. When the addition was completed, the mixture was cloudy. Refluxing was continued for 10 minutes, after which the mixture was diluted with 100 ml. of chloroform and 50 ml. of methylene chloride. The cloudy organic layer was washed twice with dilute aqueous hydrochloric acid and once with aqueous sodium chloride solution, dried over magnesium sulfate and filtered. The filtrate was vacuum stripped to yield a tan glassy solid. It was shown by high pressure liquid-liquid chromatography to comprise 65% cyclics and 35% high polymer; the structure of the cyclic product was shown by field desorption mass spectrometry to correspond generally to the formula

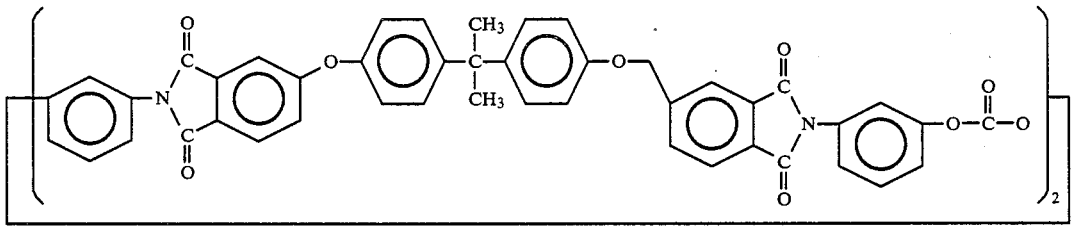

EXAMPLE 5

To 50 ml. of a 1 M solution in methylene chloride of bisphenol A bischloroformate (50 mmol.) maintained at 0° C., was added slowly, with stirring, a solution of 1.94 grams (10 mmol.) of piperazine hexahydrate in 10 ml. of a mixture of equal volumes of tetrahydrofuran and water. Stirring was continued for 15 minutes, after which the organic layer, comprising a solution of bisurethane and bisphenol bischloroformates, was withdrawn and added over 30 minutes to a slowly stirred mixture of 200 ml. of methylene chloride, 50 ml. of 2.5 M aqueous sodium hydroxide solution and 2.5 grams of triethylamine. When addition was complete, the product was worked up as described in Example 1. There was obtained the desired cyclic bisurethane carbonate product.

It was shown by high pressure liquid-liquid chromatography, after removal of high polymer by precipitation with acetone, to comprise mixed cyclics and by field desorption mass spectrometry to contain substantial proportions of compounds of the formula

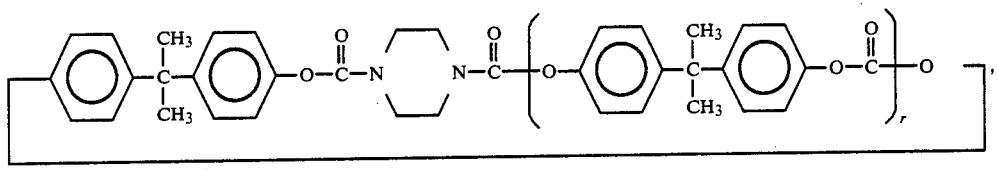

wherein r is 1 and 2 (i.e., p is 0 and 1).

EXAMPLE 6

The procedure of Example 5 was repeated, using a bischloroformate mixture corresponding to a 7:1 molar ratio of bisphenol A bischloroformate to bisurethane bischloroformate. A mixed cyclic polycarbonate product containing cyclic polyurethane carbonates was obtained.

EXAMPLE 7

Triethylamine, 2.2 grams (20 mmol.), was slowly added at 0° C., with stirring, to a solution of 10.5 grams (30 mmol.) of bisphenol A bischloroformate in 50 ml. of methylene chloride. There was then added over 15 minutes a solution of 2.5 grams of 85% pure N,N'-diphenylethylenediamine (10 mmol.) in 20 ml. of methylene chloride. The mixture was stirred for 10 minutes, washed with dilute aqueous hydrochloric acid, dried and vacuum stripped, yielding a tan solid. A sample of the product was dissolved in methylene chloride, precipitated with hexane, redissolved in methylene chloride and vacuum stripped to yield a light brown crystalline solid which was shown by infrared and proton nuclear magnetic resonance spectroscopy to be the desired bisurethane bischloroformate.

A solution of 1 mmol. of the bisurethane bischloroformate in 10 ml. of methylene chloride was added over 30 minutes to a stirred mixture of 20 ml. of methylene chloride, 2 ml. of 1 M aqueous sodium hydroxide and 40 mg. (0.4 mmol.) of triethylamine. After addition was complete, the sample was worked up as described in Example 1. High pressure liquid-liquid chromatographic analysis showed the existence of the desired cyclic bisurethane carbonate.

EXAMPLE 8

A solution of 51 mg. (0.25 mmol.) of bis(4-aminophenyl)methane in 2 ml. of methylene chloride was added at 0° C. over 15 minutes, with stirring, to a methylene chloride solution of 1.56 grams (3 mmol.) of bisphenol A bischloroformate and 100 mg. (1 mmol.) of triethylamine. The organic phase was added over 25 minutes to a mixture of 10 ml. of methylene chloride, 2 ml. of 1 M aqueous sodium hydroxide solution and 50 mg. of triethylamine. Upon workup as described in Example 1, the desired cyclic bisurethanecarbonate was obtained.

EXAMPLE 9

A solution of 10 mmol. of 2-(4-hydroxyphenyl)-2-(4-methylaminophenyl)propane and 5 mmol. of bisphenol A bischloroformate in 50 ml. of methylene chloride was placed in a small blender and agitated for 10 minutes, during which time a precipitate formed. There was then added a solution of 15 mmol. of sodium carbonate in 50 ml. of water, and the mixture was blended for an additional 1-½ hours. The organic layer was separated, dried with phase separation paper and stripped in a rotary evaporator to yield a fluffy white solid. The solid was washed twice with hexane, dissolved in a small amount of methylene chloride and precipitated slowly by the addition of ethyl ether. The precipitate was filtered, washed twice with ether and dried to yield the desired bisurethane condensation product of bisphenol A and N-methyl-N-{4-[2-(4-hydroxyphenylpropyl)]}-phenylcarbamic acid.

Following a procedure similar to that of Example 7, the above product was converted to bischloroformate and cyclized to yield the desired bisurethane carbonate oligomer mixture.

EXAMPLE 10

The procedure of Example 9 was repeated, substituting hydroquinone bischloroformate on an equimolar basis for the bisphenol A bischloroformate. A similar product was obtained.

EXAMPLE 11

The procedure of Example 9 was repeated, substituting resorcinol bischloroformate on an equimolar basis for the bisphenol A bischloroformate. A bisurethane which was soluble in ethyl ether was obtained and was converted to bischloroformate and cyclized to a bisurethane carbonate oligomer mixture by the procedure of Example 3.

EXAMPLE 12

A mixture of 114 grams (0.5 mole) of bisphenol A, 1 mole of potassium hydroxide and just enough water to effect solution was heated at 100° C. under nitrogen and 200 ml. of benzene was added; refluxing was maintained as the water was removed as a benzene-water azeotrope. After the potassium salt of bisphenol A began to precipitate, 500 ml. of dimethyl sulfoxide was added and azeotroping was continued until all the water was removed. The solution was maintained at 100° C. under nitrogen as a solution of 80 grams (0.279 mole) of bis(4-chlorophenyl) sulfone in toluene was added. The temperature of the mixture was then increased to 150° C. and the toluene was removed by distillation. After 3 hours of heating, no further sulfone could be detected by high pressure liquid-liquid chromatography. The hot solution was poured into 2 liters of 0.5 M aqueous hydrochloric acid in a blender, whereupon a white solid precipitated. It was removed by filtration, returned to the blender and washed twice with distilled water to yield a mixture of oligomeric ethersulfone bisphenols, shown by high pressure liquid-liquid chromatographic analysis to contain 22.7% monomer, 20.6% dimer, 14.7% trimer, 8.7% tetramer, 7.1% pentamer and minor amounts of higher oligomers.

A mixture of 33.5 grams of oligomeric ethersulfone bisphenols, 100 ml. of methylene chloride and 20 ml. of water was stirred and cooled to 15° C. Phosgene was passed into the mixture at 1 gram per minute for 12 minutes (total 120 mmol.) and 5 M aqueous sodium hydroxide solution was added to maintain the pH in the range of 2-4 (total sodium hydroxide 25 ml.). When the addition was complete, the organic phase was washed with dilute aqueous hydrochloric acid and a saturated aqueous sodium chloride solution, filtered and vacuum stripped to yield the desired oligomeric bischloroformate.

A mixture of 75 ml. of methylene chloride, 0.70 ml. of triethylamine and 4 ml. of 5 M aqueous sodium hydroxide solution was heated under reflux and stirred as a solution of the above-prepared bischloroformate in 50 ml. of methylene chloride was added over 35 minutes. At the same time, 0.7 ml. of triethylamine and 21 ml. of 5 M aqueous sodium hydroxide solution were added in 7 equal portions at 5-minute intervals. When reagent addition was complete, the mixture was stirred for 5 minutes and the organic phase was worked up substantially as in Example 1. There was obtained an off-white solid which was shown to comprise 16% high polymer, with the balance being cyclic polyethersulfone carbonate oligomers.

EXAMPLE 13

A solution of 50 mmol. of bisphenol A monotetrahydropyranyl ether monosodium salt (prepared as described in U.S. Pat. No. 4,273,717) and 25 mmol. of 4,4'-difluorobenzophenone in 150 ml. of dimethylformamide was heated at 100° C. for 2 hours. The reaction mixture was poured into 1.0 M aqueous hydrochloric acid and the desired ether ketone bisphenol was precipitated by addition of tetrahydrofuran.

A solution of 10 mmol. of the ether ketone bisphenol in 20 ml. of methylene chloride was cooled to 0° C. and 25 mmol. of phosgene was bubbled through over 5 minutes. Dimethylaniline, 20 mmol., was then added at 0° C. with stirring, causing a blue coloration in the mixture. Stirring at 0° C. was continued for 15 minutes, after which the mixture was sparged with nitrogen to remove excess phosgene and allowed to warm to room temperature. It was washed with 1.0 M aqueous hydrochloric acid and vacuum stripped in a rotary evaporator to yield a blue oil, which was shown by derivatization with phenol and triethylamine followed by high pressure liquid chromatographic analysis to be the desired etherketone bischloroformate.

A mixture of 15 ml. of methylene chloride, 1.5 mmol. of triethylamine and 1.5 ml. of 5.0 M aqueous sodium hydroxide was heated to reflux, with stirring, and a solution of the ether ketone bischloroformate in 15 ml. of methylene chloride was added. There were also added an additional 1.65 mmol. of triethylamine and 3.5 ml. of aqueous sodium hydroxide solution in five equal portions at 5-minute intervals. After addition was complete, the mixture was stirred for 5 minutes and the organic phase was separated and washed twice with aqueous hydrochloric acid solution, once with water and once with aqueous sodium chloride solution. It was then dried over magnesium sulfate, filtered and evaporated, yielding a blue solid which was decolorized by dissolution and column chromatography through an activated charcoal-silica gel combination. The product was the desired polyetherketone carbonate oligomer mixture.

The cyclic heterocarbonates of this invention are useful as intermediates for conversion to copolycarbonates. Accordingly, the present invention includes a method for the preparation of a resinous composition which comprises contacting at least one of the previously defined cyclic heterocarbonates with a polycarbonate formation catalyst at a temperature up to about 350° C. It also includes linear copolycarbonates of the type prepared by said method, said linear copolycarbonates comprising structural units having the formula

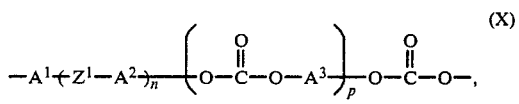

wherein $A^{1-3}$, $Z^1$, n and p are as previously defined.

Previously known methods for forming (e.g., molding) copolycarbonates are often cumbersome because of their high viscosities. On the other hand, it has not been possible to integrate preparation methods involving the use of phosgene or various monomeric esters with forming operations because of the presence of volatile solvents such as methylene chloride or by-products such as phenol, during or after polymerization. By contrast, at resin formation temperatures the cyclic heterocarbonates of this invention are liquid and substantially nonvolatile and have relatively low viscosities. Moreover, their polymerization need not involve solvents or form undesirable by-products. Thus, it is possible to integrate resin formation with such forming operations.

For example, the cyclic heterocarbonates may be polymerized during extrusion or molding operations, upon raising their temperature to conventional extrusion or molding temperatures. Molding and simultaneous polymerization may be achieved by several known techniques, including injection molding and rotational molding. The molded articles thus produced have numerous advantageous properties illustrated by high thermal stability, solvent resistance and impact strength.

The polycarbonate formation catalysts which can be used in the resin formation method of this invention include various bases and Lewis acids. It is known that basic catalysts may be used to prepare polycarbonates by the interfacial method, as well as by transesterification and from cyclic oligomers. Reference is made to the aforementioned U.S. Pat. Nos. 3,155,683, 3,274,214, 4,217,438 and 4,368,315. Such catalysts may also be used to polymerize the cyclic oligomer mixtures. Examples thereof are lithium 2,2,2-trifluoroethoxide, n-butyllithium and tetramethylammonium hydroxide. Also useful are various weakly basic salts such as sodium benzoate and lithium stearate.

A particularly useful class of Lewis bases is disclosed in copending, commonly owned application Ser. No. 723,672, filed April 16, 1985, now U.S. Pat. No. 4,605,731. It includes numerous tetraarylborate salts, including lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. The preferred catalysts within this class are the tetra-n-alkylammonium and tetra-n-alkylphosphonium tetraphenylborates. Tetramethylammonium tetraphenylborate is particularly preferred because of its high activity, relatively low cost and ease of preparation from tetramethylammonium hydroxide and an alkali metal tetraphenylborate.

Lewis acids useful as polycarbonate formation catalysts include dioctyltin oxide, triethanolaminetitanium isopropoxide, tetra(2-ethylhexyl) titanate and polyvalent metal (especially titanium and aluminum) chelates such as bisisopropoxytitanium bisacetylacetonate (commercially available under the tradename "Tyzor AA") and the bisisopropoxyaluminum salt of ethyl acetoacetate. Among the preferred catalysts are lithium stearate and bisisopropoxytitanium bisacetylacetonate.

The copolycarbonate formation reaction is typically effected by merely contacting the cyclic heterocarbonate with the catalyst at temperatures up to 350° C., preferably about 200°–300° C., until polymerization has proceeded to the extent desired. Although the use of a solvent is within the scope of the invention, it is generally not preferred. In general, the amount of catalyst used is about 0.001–1.0 mole percent based on carbonate structural units in the heterocarbonate.

The conditions of the polymerization reaction may be varied to produce resinous compositions of various molecular weights and molecular weight distributions (i.e., Mw/Mn ratios). Molecular weight can be controlled by varying the amount of catalyst, with a decrease in said amount generally resulting in an increase in molecular weight, or by employing known chain transfer or endcapping agents, of which diphenyl carbonate is an example, typically in amounts up to about 2.5 mole percent based on carbonate structural units in the heterocarbonate.

Among the processing operations which can be conducted simultaneously with polymerization are various extrusion and molding operations. Thus, the cyclic heterocarbonates may be combined with polycarbonate formation catalysts of the type described hereinabove and fed to an extruder which is maintained at polymerization temperature. The effluent from the extruder is then a polycarbonate in the desired sheet, rod or other form. The molecular weight of the product may be adjusted over a wide range by methods previously described.

Similarly, the cyclic heterocarbonates may be combined with polycarbonate formation catalysts and injection molded at polymerization temperatures. Said heterocarbonates also have flow properties adequate for rotational molding simultaneous with polymerization. These capabilities make it possible to employ the cyclic heterocarbonates of this invention in operations previously unavailable with respect to copolycarbonates.

The cyclic heterocarbonates of this invention are also advantageously combined with inert filler materials to produce prepreg compositions which may be polymerized to thermoplastic composites having excellent impact resistance, moisture resistance and ductility. The composites have a number of advantages over the somewhat more well known thermoset composites, such as the capability of being shaped after polymerization is completed.

The preparation of copolycarbonates from the cyclic heterocarbonates of this invention is illustrated by the following examples. All molecular weights are weight average and were determined by gel permeation chromatography relative to polystyrene.

EXAMPLE 14

To a solution of 508 mg. of the cyclic polyurethane carbonate of Example 5 (from which high polymer had been removed by precipitation with acetone) in 25 ml. of methylene chloride was added 0.79 mg. of tetramethylammonium tetraphenylborate. The solvent was removed by vacuum evaporation and the solid residue was dried for 4 hours in a vacuum oven at 80° C. It was then heated under nitrogen at 200° C. for 2 hours to yield the desired copolycarbonate having a molecular weight of 46,000.

EXAMPLE 15

High polymer was removed from the product of Example 4 by precipitation with acetone. A 1-gram sample of the resulting cyclic product was combined with 0.77 mg. of tetra-n-butylammonium tetraphenylborate and 20 ml. of methylene chloride. The resulting solution was vacuum stripped and the residue dried as described in Example 14. It was heated for 15 minutes under nitrogen at 305° C., yielding a yellow polymer having a molecular weight of 35,500.

EXAMPLE 16–21

Following the procedure of Example 14, various cyclic heterocarbonates were combined with 0.25 mole percent (based on carbonate structural units) of tetra-n-butylammonium tetraphenylborate and were polymerized by heating under nitrogen for 20–25 minutes at 275° C. The identities of the reactants and the molecular weights and glass transition temperature of the products are given in the following table.

| Example | Cyclic heterocarbonate | Mw | Tg, °C. |
|---------|------------------------|---------|---------|
| 16 | Ex. 1* | 179,000 | 167.3 |
| 17 | Ex. 2 | 13,500 | 119.5 |
| 18 | Ex. 3 | — | 154 |
| 19 | Ex. 6 | 53,500 | 148.1 |
| 20 | Ex. 9 | 61,000 | 153.4 |
| 21 | Ex. 12 | 72,500 | 172 |

*3:1 ratio of ester to carbonate groups.

What is claimed is:

1. A composition comprising cyclic heterocarbonate oligomers having the formula

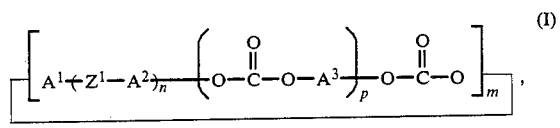

wherein:
each of $A^1$, $A^2$ and $A^3$ is independently a divalent aromatic hydrocarbon or substituted aromatic hydrocarbon radical;
$Z^1$ is a divalent radical containing at least two non-carbon linking atoms not part of a carbonate radical;
m is from 1 to about 12;
n is from 1 to about 6; and
p is from 0 to about 6;
the total number of carbonte moieties in each of said oligomers being up to about 12.

2. A composition according to claim 1, wherein $Z^1$ has a total formula weight of at least 50 and the $A^{1-3}$ radicals are each m- or p-phenylene or have the formula $$-A^4-Y^1-A^5-, \text{ tm (II)}$$

wherein each of $A^4$ and $A^5$ is a monocyclic divalent aromatic radical and $Y^1$ is a bridging radical in which one or two atoms separate $A^4$ from $A^5$.

3. A composition according to claim 2 wherein the $$-A^1(-Z^1-A^2)_{\overline{n}} \quad \text{(III)}$$

moiety has a formula weight of about 500–1500, $A^1$ and $A^2$ are both m-phenylene or have formula III, $A^3$ has formula III, each of $A^4$ and $A^5$ is p-phenylene and $Y^1$ is isopropylidene.

4. A composition according to claim 3 wherein a major proportion of the radicals of formula III are those in which n is 1, 2 and 3.

5. A composition according to claim 4 wherein $Z^1$ contains at least one ester, amide, urethane, ether ester, ether imide or ether sulfone moiety.

6. A composition according to claim 5 which is a polyester-carbonate in which $Z^1$ has the formula

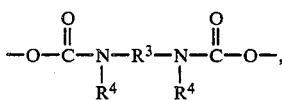
(IV)

wherein $R^3$ is a divalent $C_{2-12}$ aliphatic, alicyclic or aromatic radical, and n has an average value of 1–3.

7. A composition according to claim 6 wherein $R^3$ is m-phenylene.

8. A composition according to claim 5 which is a polyurethane-carbonate in which $Z^1$ has the formula

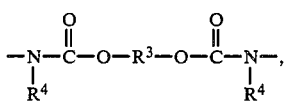
(V)

wherein $R^3$ is a divalent $C_{2-12}$ aliphatic, alicyclic or aromatic radical, and n has an average value of 1–3 and $R^4$ is hydrogen or a $C_{1-12}$ alkyl, cycloalkyl or aromatic hydrocarbon radical or both $R^4$ radicals taken together form a $C_{2-12}$ alkylene radical, and n is from 1 to 3.

9. A composition according to claim 5 which is a polyurethane-carbonate in which $Z^1$ has the formula

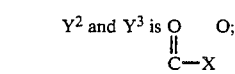
(VI)

wherein $R^3$ is a divalent $C_{2-12}$ aliphatic, alicyclic or aromatic radical, and n has an average value of 1–3 and $R^4$ is hydrogen or a $C_{1-12}$ alkyl, cycloalkyl or aromatic hydrocarbon radical, and n is from 1 to 3.

10. A composition according to claim 9 wherein $R^3$ is m-phenylene.

11. A composition according to claim 5 which is a polyimide-carbonate in which $Z^1$ has the formula

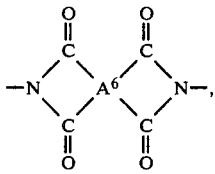
(VII)

wherein $A^6$ is a tetravalent aromatic radical, and n is 1.

12. A composition according to claim 11 wherein $A^6$ has the formula

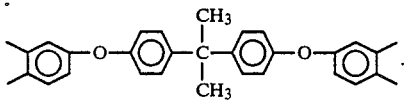

13. A composition according to claim 5 which is a polyether-polycarbonate in which $Z^1$ has the formula $$-O-A^7-Z^2-A^7-O- \quad \text{(VIII)}$$

wherein $A^7$ is a $C_{6-12}$ divalent aromatic radical and $Z^2$ is CO or $SO_2$, and n has an average value of 1—3.

14. A composition according to claim 13 wherein $A^2$ and $A^7$ are both p-phenylene.

15. A composition according to claim 5 which is a polyamide-polycarbonate in which $Z^1$ has the formula

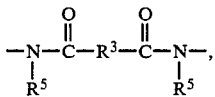
(IX)

wherein $R^3$ is a divalent $C_{2-12}$ alicyclic or aromatic radical and $R^5$ is hydrogen or a primary or secondary $C_{1-4}$ alkyl radical, and n has an average value of 1–3.

16. A composition according to claim 15 wherein $R^3$ is m-phenylene and $R^5$ is methyl.

17. A method for preparing a composition according to claim 1 which comprises reacting
(A) a composition comprising (A-1) at least one compound of the formula $$Y^2-O-A^1(-Z^1-A^2)_{\overline{n}}O-Y^2, \quad \text{(X)}$$

or a mixture thereof with (A-2) at least one compound of the formula $$Y^3-O-A^3-O-Y^3, \quad \text{(XI)}$$

wherein the $Y^2$ and $Y^3$ values in each compound are both

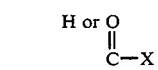

and X is chlorine or bromine, with the proviso that at least one of

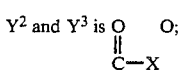

with
(B) at least one oleophilic, aliphatic or heterocyclic tertiary amine, and
(C) an aqueous alkali or alkaline earth metal hydroxide or carbonate solution;

in (D) a substantially non-polar organic liquid which forms a two-phase system with water.

18. A method according to claim 17 wherein reagent A consists essentially of reagent A-1,

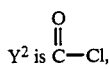

reagent B is triethylamine, reagent C is aqueous sodium hydroxide and component D is methylene chloride.

19. A method according to claim 18 wherein $Z^1$ has a total formula weight of at least 50 and the $A^{1-3}$ radicals are each m- or p-phenylene or have the formula $$-A^4-Y^1-A^5-, \quad (II)$$

wherein each of $A^4$ and $A^5$ is a monocyclic divalent aromatic radical and $Y^1$ is a bridging radical in which one or two atoms separate $A^4$ from $A^5$.

20. A method according to claim 19 wherein the $$-A^1(-Z^1-A^2)_{\overline{n}} \quad (III)$$

moiety has a formula weight of about 500–1500, $A^1$ and $A^2$ are both m-phenylene or have formula II, $A^3$ has formula III, each of $A^4$ and $A^5$ is p-phenylene and $Y^1$ is isopropylidene.

21. A linear copolycarbonate comprising structural units having the formula

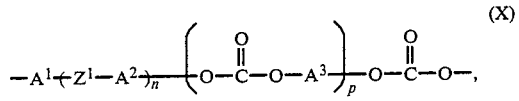

wherein
each of $A^1$, $A^2$ and $A^3$ is independently a divalent aromatic hydrocarbon or substituted aromatic hydrocarbon radical;
$Z^1$ is a divalent radical containing at least two non-carbon linking atoms not part of a carbonate radical;
n is from 1 to about 6; and
p is from 0 to about 6;
the total number of carbonate moieties in each of said units being up to about 12.

22. A composition according to claim 21 wherein $Z^1$ has a total formula weight of at least 50 and the $A^{1-3}$ radicals are each m- or p-phenylene or have the formula $$-A^4-Y^1-A^5-, \quad (II)$$

wherein each of $A^4$ and $A^5$ is a monocyclic divalent aromatic radical and $Y^1$ is a bridging radical in which one or two atoms separate $A^4$ and $A^5$.

23. A composition according to claim 22 wherein the $$-A^1(-Z^1-A^2)_{\overline{n}} \quad (III)$$

moiety has a formula weight of about 500–500, $A^1$ and $A^2$ are both m-phenylene or have formula II, $A^3$ has formula III, each of $A^4$ and $A^5$ is p-phenylene and $Y^1$ is isopropylidene.

24. A composition according to claim 23 wherein a major proportion of the radicals of formula III are those in which n is 1, 2 and 3.

25. A composition according to claim 24 wherein $Z^1$ contains at least one ester, amide, urethane, ether ester, ether imide or ether sulfone moiety.

26. A method for the preparation of a resinous composition which comprises contacting at least one composition according to claim 21 with a polycarbonate formation catalyst at a temperature up to about 350° C.

27. A method according to claim 26 wherein the polycarbonate formation catalyst is a tetraarylborate salt.

28. A method according to claim 27 wherein the $Z^1$ has a total molecular weight of at least 50 and the $A^{1-3}$ radicals are each m- or p-phenylene or have the formula $$-A^4-Y^1-A^5-, \quad (II)$$

wherein each of $A^4$ and $A^5$ is a monocyclic divalent aromatic radical and $Y^1$ is a bridging radical in which one or two atoms separate $A^4$ from $A^5$.

29. A method according to claim 28 wherein the $$-A^1(-Z^1-A^2)_{\overline{n}} \quad (III)$$

moiety has a formula weight of about 500–1500, $A^1$ and $A^2$ are both m-phenylene or have formula II $A^3$ has formula III, each of $A^4$ and $A^5$ is p-phenylene and $Y^1$ is isopropylidene.

* * * * *